Figure 2:
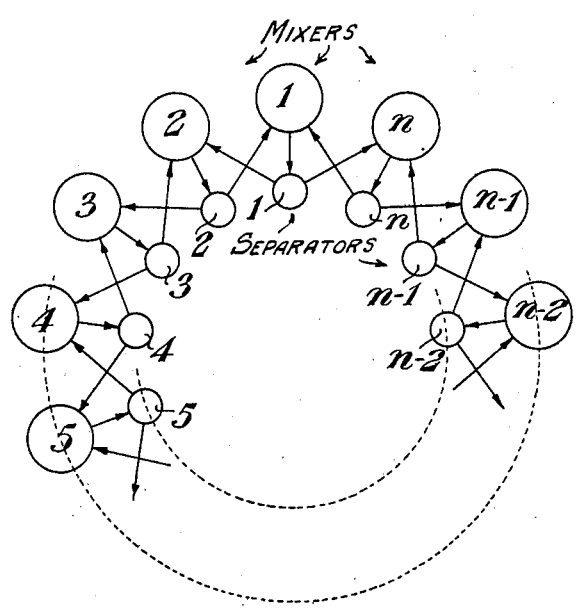

June 10, 1952  J. D. A. JOHNSON  2,599,836
SEPARATION OF SOLUTES BY CONTINUOUS SOLVENT EXTRACTION
Filed Nov. 18, 1949  2 SHEETS—SHEET 1
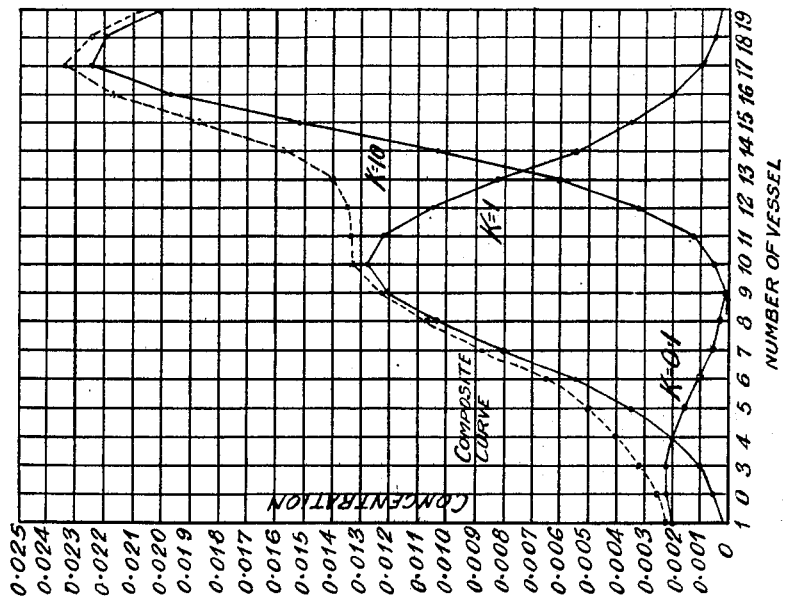
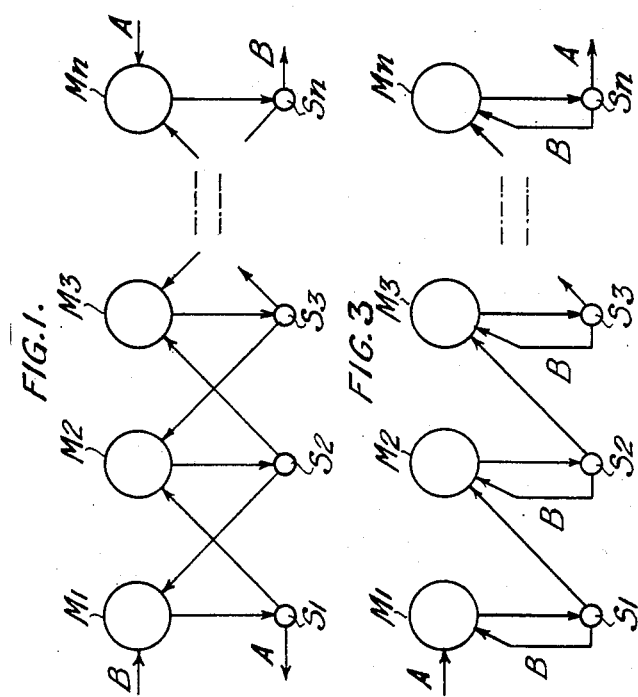
Inventor: John Dobney Andrew Johnson,
By his attorneys, Baldwin, Wight, & Brevost Patented June 10, 1952

2,599,836

UNITED STATES PATENT OFFICE 2,599,836

SEPARATION OF SOLUTES BY CONTINUOUS SOLVENT EXTRACTION

John Dobney Andrew Johnson, Dorking, England, assignor to Beecham Research Laboratories Limited, Betchworth, Surrey, England, a company of Great Britain Application November 18, 1949, Serial No. 128,167
In Great Britain November 29, 1948

6 Claims. (Cl. 260—705)

This invention relates to the separation of solutes by continuous redistribution between immiscible or partially miscible solvents.

Continuous counter-current extraction has hitherto been carried out by permitting immiscible liquids to move continuously in opposite directions in columns or through a series of vessels, solute being redistributed between or transferred continuously from the one solvent to the other in such a way that it is removed from admixture with other solutes to a greater or lesser degree. In all published processes (except those detailed below) the solutes enter the system continuously and the effect can be likened to the continuous stripping out of one or more components from the solute mixture. For example, desirable components of a crude oil are removable by permitting the crude oil to mix with a suitable solvent in a line mixer, and then allowing the mixture to separate into two layers in a separator. The two phases then move in opposite senses to adjacent line mixers where the process is repeated (Knox et aliae, Ind. Eng. Chem., 1947, 39, 1573), and so on. Or phenols are removed continuously from coal tar liquors by counter-current extraction with alkali (Murdoch and Cuckney, Ind. Chemist, 1946, 22, 741).

The exceptions referred to above are a partially successful concentration of vitamin A by Cornish et aliae (Ind. Eng. Chem., 1934, 26, 397) who used a long tube broken up into compartments, the mixture of solutes being introduced at a given point somewhere near the middle of the tube, the solvents being introduced at opposite ends, and that of Martin and Synge (Biochem. J., 1941, 35, 91) who used a bank of 40 mixing vessels connected together by wide glass tubes which acted as separators.

Both these methods proved unsatisfactory because the mixers and separators did not form sufficiently discrete units, because the volume of the separators compared with that of the mixers was too great or because of imperfect separation of phases.

According to the present invention there is provided an improved process for the separation of solutes by continuous redistribution between solvents of the type wherein a definite quantity of a mixture of the solutes is initially introduced into a separating plant and a first solvent is caused to flow continuously through the plant which contains, or through which is caused to flow in counter-current, a second solvent immiscible or partially miscible with the first. The process of the invention is characterised in that the plant comprises a series of units each consisting of a mixer of relatively large capacity connected to deliver its contents to a separator (distinct from the mixer) of relatively small capacity, the latter being connected to deliver the separated first solvent to the mixer of the next succeeding unit and being connected to deliver the separated second solvent back to the first-mentioned mixer or, in the case of the second solvent being caused to flow in counter-current, to the mixer of the preceding unit. In this latter case the mixers and separators may be so arranged that the two solvents enter the system at the two ends and leave at two opposite ends, or the vessels and mixers may form a closed system in which the two solvents circulate in contrary directions.

The mixers may be any suitable vessels in which solvents may be stirred or otherwise agitated to produce a homogeneous mixture, the delivery to the separators being so arranged that the liquid passing from a mixer into an associated separator is a representative sample of the liquid in that mixer at that time.

It will be appreciated that the invention has two main variants, i. e. one in which the second solvent is passed through the plant in counter-current to the first solvent, both solvents passing continuously out of the system or both being retained in the system, and the other in which the second solvent only is retained in the plant.

An embodiment of the first variant of the invention is diagrammatically illustrated in Figures 1 and 2 of the accompanying drawings and an embodiment of the second variant of the invention is diagrammatically illustrated in Figure 3 of the accompanying drawings.

Figures 4 and 5 are graphs illustrating the separational distribution of solutes which is effected by the use of the plant of Figure 1.

Referring to Figure 1, the plant comprises $n$ units each consisting of a mixer M and a separator S, the several mixers being denoted in the drawing by the reference $M_1, M_2 \ldots M_n$ and the several separators being denoted by the reference letters $S_1, S_2 \ldots S_n$.

The solvent A is introduced into the mixer $M_n$ at one end of the plant, and leaves at the separator $S_1$ at the other end of the plant. The solvent B enters at the mixer $M_1$ and leaves the plant at the separator $S_n$.

The arrows indicate the lines of flow from mixers to separators and from separators to mixers respectively. The arrow between the mixer and separator of a particular unit indicates a delivery of homogeneous mixture from the mixer to separator whilst the arrows connecting a separator to the mixers of the adjacent units indicate the flow of the portions of the mixture which are separated in that separator.

Referring to Figure 2 the plant comprises $n$ units each consisting of a mixer M and a separator S, the reference letters in Figure 2 having the same significance as those in Figure 1. The plant contains a fixed quantity of the first solvent and a fixed quantity of the second solvent which are caused to travel in counter-current through the system in a manner indicated by the arrows.

It will be understood that the separators applicable to the systems indicated by Figures 1, 2 and 3 may be of the gravity, centrifugal or other type and that the flow of liquid is effected in some conventional manner.

It will be noted that each mixer and its associated separator form a discrete unit and that there is no chance of a portion of the contents of one mixer passing into an adjacent mixer except after due separation in the separator associated with the first-mentioned mixer.

The mixture of solutes to be separated is initially introduced into one of the mixers which, if the plant be of the type indicated by Figure 1 is preferably in the central region; it is immaterial into which vessel of the system indicated by Figure 2 the solute is placed. When the flow of the solvents is initiated the solutes will move according to their distribution coefficients. The solutes with values of distribution coefficients greater than unity will move on the average in one direction, while those with coefficients less than unity will move on the average in the other direction if the feed rates of the solvents are equal, but the rates at which the solutes move and the direction of movement depends on the solvent feed rates and the particular values of distribution coefficients.

By choosing a sufficiently long system of vessels, that is a large number of units, solutes will be caused to issue from one or both ends of the system indicated by Figure 1, comparatively free from admixture with one another and in the system indicated by Figure 2 the solutes will be found to predominate severally in vessels determined by the time of operation of the plant.

The graph shown in Figure 4 indicates the separation of three solutes having respectively distribution coefficients in solvent B with respect to solvent A of 0.1, 1.0 and 10.0. The curves in the graph are marked with these distribution coefficients $k=0.1$, $k=1$ and $k=10$ and the ordinates of these curves show the concentrations of the solutes to which they relate in the respective mixing vessels of a plant in accordance with Figure 1 which in this case is considered to contain 19 vessels. It will be understood that the curves indicate the separational distribution of the solutes at the end of a given period of time.

It will be noted that the end vessels of the system are practically free of solute $k=1$ which, therefore, has shown little tendency to leave the system at all. On the other hand the separation of the solutes $k=0.1$ and $k=10$ is substantially complete, the former leaving the system at the one end and the latter leaving at the other end.

The behaviour of a system of the type indicated by Figure 2 is similar but the time of operation of the plant must be chosen with care since the separated components of the solute mixture may tend to re-mix if the period of operation is prolonged.

The example illustrated by the graph of Figure 4 applies to solutes with widely different values of $k$ in a system of the type indicated by Figure 1 where the number of mixers and separators is large. Solutes with closer values of $k$ would require a more extended system of vessels to ensure such sharp separation and this is indicated in the graph of Figure 5 which relates to six solutes. The number of vessels in this case is an indefinitely large number and the direction of movement of the solutes is determined by their distribution coefficients and the feed rates of the solvents. The ordinates are related to the quantities of the solutes present. It will be noted that solutes tend to congregate in sets of vessels determined by their values of $k$. Complex mixtures of many solutes are therefore readily separable provided that a sufficient number of vessels is included in the system.

It will be appreciated that as time goes on the waves representing the solutes moving to the left will move progressively in that direction, while those moving to the right will move progressively contrariwise so that the several solutes can be successively eliminated from each end of the system each in a reasonably good state of purity provided that consecutive solutes eliminated from a given end differ sufficiently with regard to their $k$ values.

Referring now to Figure 3 the plant comprises a series of mixers $M_1$, $M_2$ ... $M_n$ and a series of separators $S_1$, $S_2$ ... $S_n$ as in Figure 1.

The solvent A is introduced into mixer $M_1$ at one end of the plant and leaves at the separator $S_n$ at the other end of the plant. Unlike the previous example, however, solvent B does not flow throughout the length of the plant, different portions of solvent B being confined to separate units. The arrows from mixer to separator indicate a delivery of homogeneous mixture whilst the arrows from separator to mixer represent the flow of separated portions of the liquid as before.

Initially all the mixers are partly filled with solvent B, and preferably they are almost completely filled therewith. When solvent A is being fed through the system, a homogeneous mixture of A and B rich in B, will be be produced in each mixer, a typical sample of the mixture being continuously delivered to the associated separator wherein A and B separate out into layers, B being then returned to the same mixer and A being passed on to the next succeeding mixer.

A batch of solute is now introduced into mixer $M_1$ whereupon the components having different distribution coefficients between A and B distribute between the two solvents A and B accordingly. If the distribution coefficient of a component of the solute in A with respect to B is much greater than unity, little of it will dissolve in B in any mixer and the bulk of this component will pass through the plant at a fairly rapid rate. For solute components whose distribution coefficients are not much greater than unity, however, there will be a delaying action on their flow through the plant since a certain amount will dissolve in B and after separation will be returned to the same mixer again leaving only that portion which has dissolved in A to continue through the plant. Ultimately however substantially all the solute will have emerged at $S_n$ since the solvent A always dissolves a certain amount of solute in any unit and carries it on to the next unit, whatever its distribution coefficient.

After the introduction of solute into $M_1$ the concentration of any solute component in any of the mixers $M_2$, $M_3$ ... $M_n$ rises to a maximum and then falls again and these concentration maxima will pass along the plant at a rate directly proportional to the distribution coefficients of the components to which they relate, if the mixers are initially practically filled with B. Thus with a plant consisting of a large number of units the concentration maxima will become well spaced and the emergent solvent A will contain substantially only one solute component at a time, provided that the $k$ values of the several components are not too close together, and in this way very complete separations may be carried out.

The invention may of course be used to separate the components of many different types of mix such as the separation of the various penicillins normally produced by mould growth and in the separation of specific amino-acids from protein hydrolysates.

Each of the processes illustrated by Figures 1, 2 and 3 may be varied by altering the feed rates of the solvents until insufficient time is allowed for the contents of the mixers to reach the equilibrium which would be otherwise reached if the feed rates of solvents were sufficiently slow. Thus two solutes having identical values of $k$ may be separated if the rate of equilibration of the one solute between the two solvent phases is different from the rate of equilibration of the other solute between the two solvent phases.

The following examples illustrate but do not limit the invention.

EXAMPLE 1

*Separation of succinic and oxalic acids*

A mixture of 25 grams of oxalic acid and 25 grams succinic acid was placed in the 10th vessel of a series of 19-vessels arranged according to Figure 1. The solvents used were n-butanol saturated with water and water saturated with n-butanol. With a flow rate ratio of 0.615 (butanol>water) the succinic acid issued approximately 82 per cent. pure and the oxalic acid 99 per cent. pure.

EXAMPLE 2

*Isolation of glutamic acid from a protein hydrolysate*

A casein hydrolysate freed as far as possible from glutamic acid by other means, was neutralised and subjected to extraction in an apparatus of the type indicated by Figure 2 and comprising 15 vessels. Using butanol as moving solvent phase, unwanted amino-acids and other material were largely removed from vessels 1, 2 and 3 thus permitting the isolation of a further 10 per cent. of the glutamic acid originally present, from the contents of these three vessels.

When we specify herein that the separator must be "distinct from the mixer," we mean that the two parts must be distinct in function. The separator and mixer may of course be embodied in a unitary structure but they will be quite distinct from each other within that unitary structure.

I claim:

1. A process for the separation of batch-fed solute mixtures by continuous redistribution between solvents in a separating system, comprising a series of unitary zones each containing a mixing sub-zone in which uniform composition is obtained by mechanical agitation and a separating sub-zone in which separation is dependent upon the respective specific gravities of the separated components and which sub-zone is capable of containing only a small quantity of liquid in comparison with that contained in the mixing sub-zone, said sub-zones being distinct from one another, said process being characterized in that a batch of a mixture of solutes is introduced into the system, a first solvent is caused to flow continuously through the system, and a second solvent not completely miscible with the first solvent is introduced into the system, the contents of each mixing sub-zone being delivered to the separating sub-zone of the same unitary zone, the separated first solvent from each separating sub-zone being delivered separately from said mixing sub-zone contents to the mixing sub-zone of the next succeeding unitary zone, and the separated second solvent from each separating sub-zone being delivered separately from said mixing sub-zone contents and from said first solvent to a mixing sub-zone of a unitary zone preceding that to which the separated first solvent is delivered.

2. A process for the separation of batch-fed solute mixtures by continuous redistribution between solvents in a separating system, comprising a series of unitary zones each containing a mixing sub-zone in which uniform composition is obtained by mechanical agitation and a separating sub-zone in which separation is dependent upon the respective specific gravities of the separated components and which sub-zone is capable of containing only a small quantity of liquid in comparison with that contained in the mixing sub-zone, said sub-zones being distinct from one another, said process being characterized in that a batch of a mixture of solutes is introduced into the system and a first solvent is caused to flow continuously through the system which initially contains a second solvent not completely miscible with the first solvent, the contents of each mixing sub-zone being delivered to the separating sub-zone of the same unitary zone, the separated first solvent from each separating sub-zone being delivered separately from said mixing sub-zone contents to the mixing sub-zone of the next succeeding unitary zone, and the separated second solvent from each separating sub-zone being delivered separately from said mixing sub-zone contents and from said first solvent back to the mixing sub-zone of the same unitary zone.

3. A process as claimed in claim 2 in which the second solvent is introduced into each of the unitary zones and the first solvent is introduced continuously at one end of the system and withdrawn at the other end, the mixture of solutes being introduced at the same end of the system as the first solvent.

4. A process for the separation of batch-fed solute mixtures by continuous redistribution between solvents in a separating system, comprising a series of unitary zones each containing a mixing sub-zone in which uniform composition is obtained by mechanical agitation and a separating sub-zone in which separation is dependent upon the respective specific gravities of the separated components and which sub-zone is capable of containing only a small quantity of liquid in comparison with that contained in the mixing sub-zone, said sub-zones being distinct from one another, said process being characterized in that a batch of a mixture of solutes is introduced into the system, a first solvent is caused to flow continuously through the system, and a second solvent not completely miscible with the first solvent is forced to flow continuously through the system in countercurrent to the first solvent, the contents of each mixing sub-zone being delivered to the separating sub-zone of the same unitary zone, the separated first solvent from each separating sub-zone being delivered to the mixing sub-zone of the next succeeding unitary zone, and the separated second solvent from each mixing sub-zone being delivered to the mixing sub-zone of the preceding unitary zone.

5. A process as claimed in claim 4 in which the solvents are introduced one at each end of the system and withdrawn at opposite ends, the mixture of solutes being introduced into the system at a point remote from both ends.

6. A process as claimed in claim 4 in which the unitary zones of the system are connected to form a closed circuit and the system contains a fixed quantity of each of the two solvents which are caused to flow in countercurrent.

JOHN DOBNEY ANDREW JOHNSON.

REFERENCES CITED

The following references are of record in the file of this patent:

UNITED STATES PATENTS

| Number | Name | Date |
|---|---|---|
| 708,494 | Randall | Sept. 2, 1902 |
| 863,062 | Griswold, Jr. | Aug. 13, 1907 |
| 2,076,126 | Guinot | Apr. 6, 1937 |
| 2,079,511 | Klar et al. | May 4, 1937 |

OTHER REFERENCES

Ind. and Eng. Chem., vol. 26, 1934, pp. 397–405.
Biochem. J., 1941, vol. 35, pp. 91–120.